April 23, 1968

M. A. GOETZ 3,380,029

SORTING SYSTEM

Filed April 9, 1965

INVENTOR.
Martin A. Goetz
BY
Williman and Jacobs
ATTORNEYS.

April 23, 1968  M. A. GOETZ  3,380,029
SORTING SYSTEM
Filed April 9, 1965  8 Sheets-Sheet 2

INVENTOR.
Martin A. Goetz
BY
ATTORNEYS.

United States Patent Office 3,380,029
Patented Apr. 23, 1968

3,380,029
SORTING SYSTEM
Martin A. Goetz, Princeton, N.J., assignor to Applied Data Research, Inc., a corporation of New Jersey
Filed Apr. 9, 1965, Ser. No. 447,002
2 Claims. (Cl. 340—172.5)

ABSTRACT OF THE DISCLOSURE

In a data processing system employing a computer and a plurality of magnetic tape units, a control system for sorting data is made up of three iterative control-signal loops. A first such loop successively develops sets of data signal combinations into sorted strings of the first order which are successively written on the tape units. Each tape unit is rewound while a successive one of the tape units is receiving its sorted string. A second such loop performs a merge on all of these first-order strings except one, and the resultant second-order merged string is written on the remaining tape unit. When all of the tape units have merged strings of the same higher order, the second loop performs an additional merge of all but one of these strings and writes the string of the next higher order on the remaining tape. A third loop directs the alternating operation of the first and second control loops.

---

This invention relates to data processing systems and particularly to a system for sorting large quantities of data or records.

This invention is described in an article by applicant, "Some Improvements in the Technology of String Merging and Internal Sorting," in the Conference Proceedings of the American Federation of Information Processing Societies, vol. 25, 1964, pp. 599 to 607, and that article and the background material therein including the cited references are incorporated herein by reference.

The sorting of statistical, business, or other data commonly makes use of data processing systems, in which magnetic tape data recorders are used to store the records that are to be sorted and are also used in the intermediate steps of the sorting process. The ultimate goal is that of producing a completely sorted series of records on one or more such data recorders or tape memory units. The collation sort is a general type that is composed of two basic sorting techniques or sub-programs. The first such technique or sub-program internally sorts a group of records or data, and the group of data after being sorted is referred to as a "string" or "initial string." Such a sub-program is referred to as an "internal sort." The second such technique or sub-program merges two or more strings and produces a longer string as its output. Such a sub-program is referred to as a "merge" or "string merge." The collation sort eventually produces one string which contains all the data.

Generally, the internal sort sub-program is used in the data processing system to operate on the input data but a single time, and the merge sub-program is used in the data processing system to operate on the data one or more times as may be required. Generally, sorting systems are developed to minimize the execution time of the merge sub-program.

This invention is applicable to magnetic tape memory units, or their equivalent, which are effective to read data stored therein only while the tape is being moved in the forward direction. The invention is also applicable with other memory units, such as tape units, that can read while being rewound in the backward direction and is applicable with such tape units where the read-backward characteristic is undesirable for one reason or another.

An object of this invention is to provide a new and improved system for sorting large quantities of data in an efficient manner by means of a data processing system.

Another object of this invention is to provide a new and improved sorting system for sorting data by means of tape memory units or their equivalent that are operated for reading in one direction.

Another object of this invention is to provide a new and improved method of operating a data processing system by means of an internal sort technique and a string-merge technique, and for oscillating between these techniques.

In accordance with an embodiment of this invention, a data processing system is provided in which a plurality of tape memory units are utilized for serially storing data records or units in strings and which are consistently read in one direction. The data processing system also has a memory and an arithmetic unit as well as a control unit for operating the various parts of the system in a certain sequence of operations called the program. The program is preferably of the stored variety in which the memory contains signal combinations representing successive operations to be performed, the operations being stored at certain ones of the memory addresses, and the control unit being effective to carry out these operations in a certain sequence determined by the program and by the data itself that is being stored. The program includes an internal sort sub-program and a string-merge sub-program as well as an overall program in accordance with the invention. This program may also be in the form of circuitry such as logic which is built into the data processing system so that a special purpose system is provided for this sorting program.

The overall control program includes the steps of performing an internal sort on successive pluralities of the records and writing the internally sorted input records as N strings on N different tape units. Thereafter, a merge operation is performed in which the strings on the first N−1 tape units are merged and written as a first-order merge-string on the Nth tape unit immediately following the Nth string thereon. After completing this cycle of operation, similar cycles are repeated to develop first-order merge-strings on each of the tape units. Thereafter, a second order merge is performed on the first-order merge-strings stored on the second through Nth tape units, and the second-order merge-string is stored on the first tape unit immediately following the first-order merge thereon. The system then reverts to successive ones of the original cycles of alternating internal sort and merge operations and thereby develops second-order merge-strings on all of the tape units. The second-order merge-strings are then merged into a third-order merge-string on one of the tape units. This process continues indefinitely in the fashion described until all of the input data is sorted on one tape unit.

The foregoing and other objects of this invention, the features thereof, as well as the invention itself, may be more fully understood from the following description, when read together with the accompanying drawing, in which:

FIGS. 1A through 1M are schematic block diagrams of a tape sorting system embodying this invention, of which

In the drawing, corresponding parts are referenced throughout by similar numerals. The numerals for referencing parts in the drawing start with 100 and continue from then on. Numerals less than 100 refer to the tape units and to the strings in an ordinal fashion.

Figure 1A:
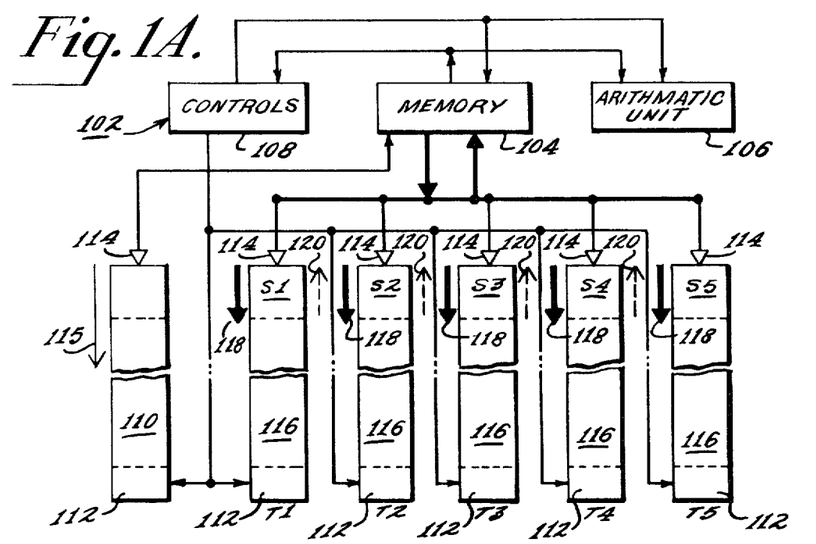
FIG. 1A is a schematic block diagram of a data processing system including a plurality of tape memory units operated in a certain sequence.

In the embodiment of the invention shown in FIG. 1A, a data processing system 102 is shown that includes a memory 104, an arithmetic unit 106 and a set of controls 108. This system 102 may be any suitable form of digital computer in which data stored in the memory 104 is supplied under the direction of the controls 108 to the arithmetic unit 106 for processing and then returned to the memory 104 to be stored at an appropriate location there. The controls 108 determine the memory locations from which information is taken to be processed in the arithmetic unit as well as the memory locations to which it is returned and also determine the timing of the flow of electrical signals representing the information. The controls 108 also determine the particular operations performed by the arithmetic unit as well as the time interrelations thereof. The various connections between the parts 104, 106, and 108 are shown by single lines with arrowheads representing the direction of control or information signal flow. In practice, various numbers of such control lines are required, and the details are omitted here since they are unnecessary to an understanding of the invention.

The data processing system 102 may be any of various well-known types of systems such as that involving a program stored in memory 104 in the form of signals representing sequences of control instructions which are supplied to the controls 108 from its storage in the memory 104 as called for to perform the required operations. Alternatively, the controls 108 may have a fixed program wired and/or built-in which may take the form of logic combinations of gates and other circuits to perform the proper sequence of operations in accordance with well-known techniques.

The input portion of the data processing system 102 is represented as a magnetic tape unit 110 having reeling controls 112 for winding and rewinding the magnetic tape as well as appropriate read-write recording heads and associated circuitry 114. This magnetic tape unit 110 may be assumed to have recorded thereon the data in an unorganized or random form, and signal combinations representing the data are to be supplied to the memory 104 under the direction of signals from controls 108 that are supplied to the reeling control 112. A plurality of other such tape units 116 are provided of any suitable number; five such units 116 are shown represented by the references T–1 to –5 by way of illustration. The controls 108 supply operating signals for winding and rewinding these tape units to the control portions 112 thereof. In addition, their read-write heads 114 are connected in a suitable fashion to the memory inputs and outputs 104 to supply and receive therefrom signals to be recorded on the magnetic tape of each unit. The selection of a particular tape unit 116 for reading or writing and for forward-winding is under the direction of controls 108 and is achieved by means of control signals to the control portions 112 and to appropriate controls (not shown) in conjunction with the read-write heads 114 or their associated amplifiers and control circuits.

In operation, a first block of data of a certain length is read from the input tape 110 and supplied to appropriate memory locations 104 as directed by the controls 108. This data may be in the form of a plurality of records, each of which has a tag or identifier portion, which tags are to be sorted in some predetermined arrangement, and the accompanying records are carried along with the tags so that the entire body of information is thereby sorted. The ultimate purpose of the operation is to sort all of the data on input tape 110 into the desired arrangement and to record it in that arrangement on one of the output tapes 116. The block of informations read from the input tape 110 is sorted into a string of sorted data by the operation of the arithmetic unit and memory 104 by means of the controls 108 under the direction of a sub-program for initially sorting this information. This string of sorted data is identified as string S–1 which is read out onto output tape unit T–1 starting with its initial storage location and continuing thereafter. The operation of the tape unit T–1 in the forward direction and the writing of information thereon is indicated by the double-line arrow 118 adjacent to the tape. The sorted string of information S–1 is shown in FIG. 1A as being recorded in the appropriate location.

Thereafter, a second block of data is read from the input tape 110 into the memory 104 and the initial sub-program for sorting is again utilized to develop a second string S–2 of sorted data. At the same time, tape T–1 is actuated by controls 108 to rewind to its initial position, which operation is represented by the broken line arrow 120 to the right of the tape. The second string S–2 is written on T–2 in a similar fashion, and it is thereafter rewound to its initial position, as represented by the corresponding arrows 118 and 120. In a similar fashion, strings S–3, –4, and –5 are developed successively by the initial sort sub-program in the data processing system 102 and successively recorded on tape units T–3, –4, and –5, respectively, in the manner described. Each of the tape units T–2, –3, –4 is rewound during the sorting of the string for the succeeding tape unit. Tape unit T–5 is not rewound upon the completion of the writing of S–5 thereon, and it is held in that position until the next stage of the sorting operation. The conditions of the output tapes T–1 to –5, indicated in FIG. 1A, represent the completion of the first step of the sorting process.

Figure 2:
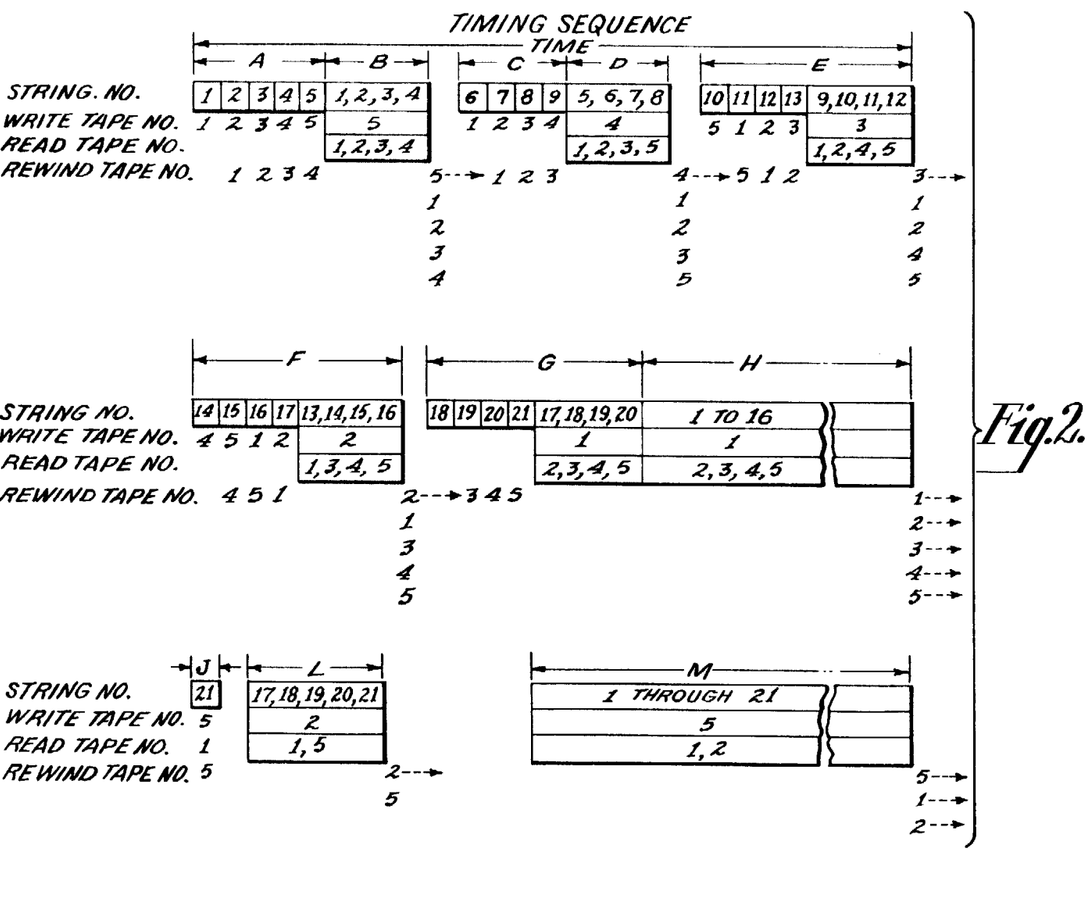
FIG. 2 is a schematic idealized graphical diagram illustrating the time relations of different operations performed in carrying out the invention of FIG. 1.

Shown in FIG. 2 is the time relationship of the operations described above for FIG. 1A: The string members being operated on are shown in the first line; thereunder in the second line are the tape units on which the strings are being written; in the third line are the tape units being read; and in the fourth line are the tape units which are being rewound at any time. The timing diagram of FIG. 2 is a simplified and idealized diagram presented to illustrate the general and overall time relationships of the sequential and concurrent operations being performed, and it omits the precise details of the various equipment operations which are unnecessary for an understanding of the invention, which would be readily apparent to one skilled in the art, and which would vary with different types of equipment. FIG. 2 is not represented on a linear time scale, but the successive steps of operation are identified by alphabetic references to the associated figures that make up FIG. 1.

Figure 1B:
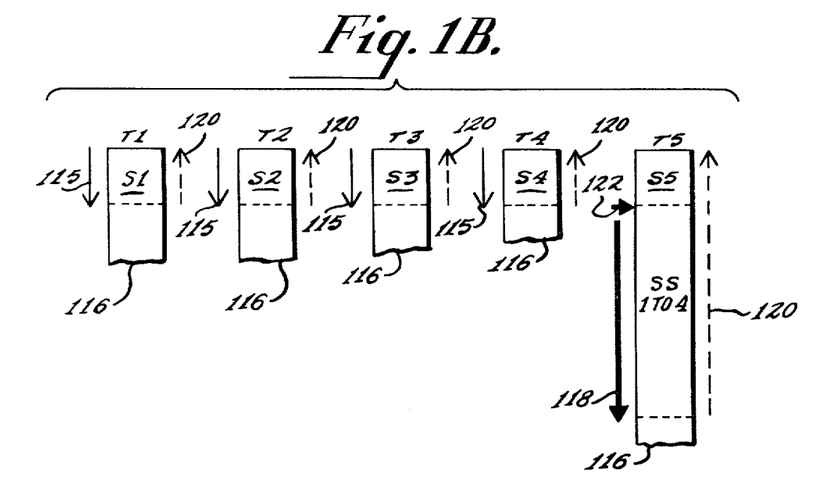
FIGS. 1B through 1M are schematic block diagrams of successive stages of the sorted data on the tape units as the data processing system is operated in accordance with this invention.

Upon completion of the first step of the sorting process as represented by the writing of an initial string S–5 on the last tape unit T–5 and by all of the preceding tape units T–1 to –4 being in rewound condition to their initial positions, the controls 108 switch over to the second step of operation or merge sub-program. This second step is shown in FIG. 1B (in which only T–1 to –5 are shown); the starting position for tapes T–1 to –4 is the initial position on each tape, and for T–5 it is the end of string S–5 as indicated by the point of triangular arrowhead 122 at T–5. The tape units T–1 to –4 are operated in the forward direction and read during that time as indicated by the single line arrows 115. The successive records read from these tapes are merged into a single string by the processing system 102, and the merged string is written on T–5, where it is shown as SS–1 to –4 to indicate that a second level of sorting has been performed. The merged string SS–1 to –4 is written on T–5 starting after the initial string S–5 on that tape.

The time sequence diagram of FIG. 2 illustrates that during the four time periods of this second step of operation that the initial strings S–1 to –4 are operated on concurrently, and the merged string is written on tape unit T–5 as the tape units T–1 to –4 are being read concurrently. After the merged string SS–1 to –4 is recorded on T–5, the controls 108 operate all of the tape units to rewind them which is indicated as taking place during the next time period illustrated in the timing sequence of FIG. 2; none of the strings is operated on during this time period. The third step of the operation is initiated as soon as the first tape unit T–1 is rewound, and the fifth unit T–5 continues to rewind thereafter since it has a substantially longer length of tape to rewind.

Figure 1C:
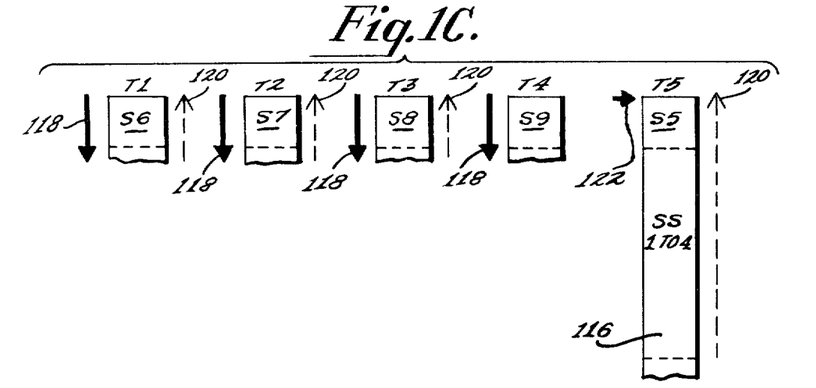

The third step of operation, illustrated in FIG. 1C, is similar to the first step and involves the successive developments of the next four initial strings S–6 to –9 and the recording of those strings successively on tape units T–1 to –4, respectively. That is, the next block of data is read from input tape 110 and sorted by an initial string sub-program and written as string S–6 on T–1, and thereafter the next string S–7 on T–2, with T–1 being rewound while the string S–7 is being developed, and so on. When T–4 has S–9 written thereon, however, it is not rewound; and T–5 remains unoperated in its initial position as illustrated by arrowhead 122.

Figure 1D:
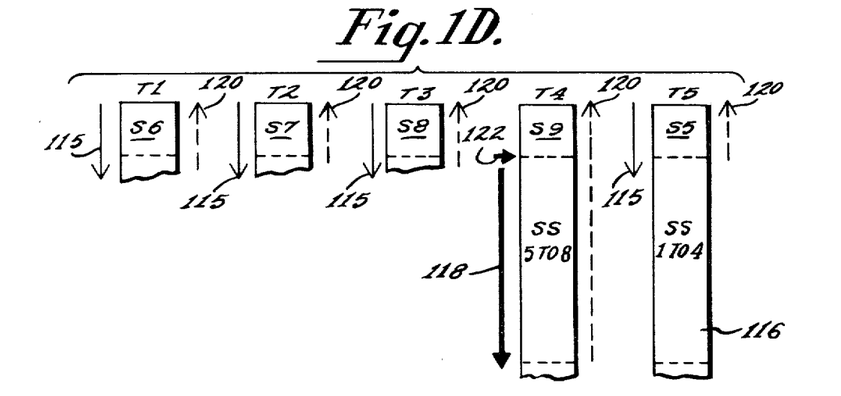
Figure 1E:
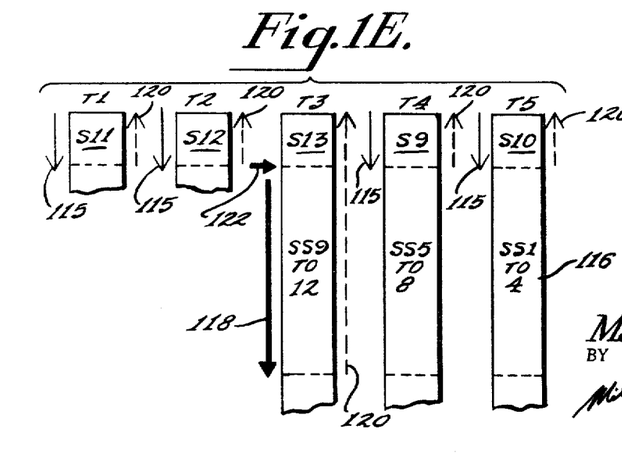

During the fourth step of operation, FIG. 1D, the conrols 108 switch the operation to a merge sub-program in which strings S–5 to –8 that are read from T–5, –1, –2, –3, respectively, are merged into a string SS–5 to –9 and recorded on T–4 immediately after S–9. Thereafter, all of the tape units are rewound to their initial position, and when T–1 is so rewound, the next step of operation is performed. That is, following the sequence illustrated in FIG. 2, initial strings S–10 to –13 are developed by internal sorts and recorded on T–5, –1, –2, –3, respectively, in that order, and thereafter rewound, except the last such tape unit T–3 which is in position to receive the next first-order merge as indicated by the arrowhead 122 in FIG. 1E. Then the initial strings S–9 to –12 are merged on T–3 (FIG. 1E), and all of the tape units are then rewound to their initial positions.

In a similar fashion, initial strings S–14 to –17 are developed as described above and respectively written on tape units T–4, –5, –1, and –2 in order; thereafter, initial strings S–13 to –16 are merged and written on T–2 in the manner described above and as illustrated in FIG. 1F. This cycle is again repeated with initial strings S–18 to –21 being developed and written on T–3, –4, –5, –1, respectively; thereafter, initial strings S–17 to –20 are merged and written on T–1 (FIG. 1G) in the manner described above.

Figure 1F:
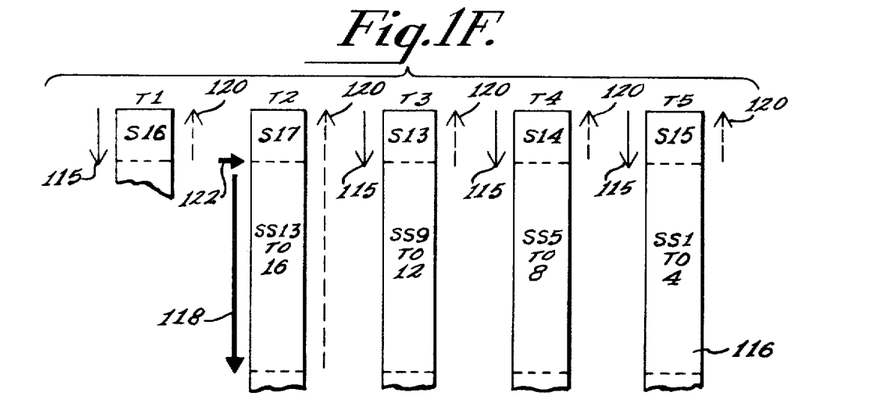
Figure 1G:
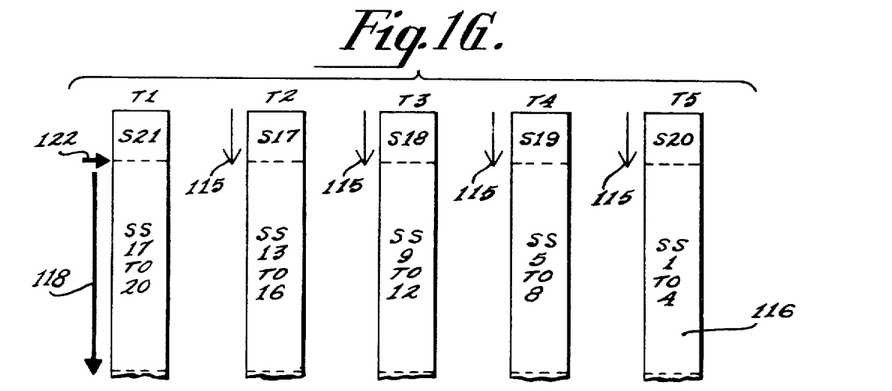

When all of the tape units have a first-order merge written thereon, as illustrated in FIG. 1G, this condition is recognized by the controls 108, and the tape units are not rewound; instead, the controls are operated to proceed with a second-order merge. This operation consists of merging the first-order merge strings SS–1 to –4, SS–5 to –8, SS–9 to –12, and SS–13 to –16, to develop therefrom a single merged string SSS–1 to –16 which is recorded on T–1 immediately following the first-order merge string SS–17 to –20 that is recorded thereon, as illustrated in FIG. 1H.

To summarize the operation performed thus far, the sorting process of this invention incorporates the following pattern: Initially, internal sorts are performed on successive blocks of data from the input tape 110 and successively recorded on the output tapes 116. After all of the output tapes contain an internal sort, a first-order merge is performed on the internally sorted strings that are on all of the output tapes except the last tape, and this first-order merge string is recorded on the last tape. This cycle is then repeated in which another set of internal sorts are developed successively followed by another first-order merge on the next-to-the-last tape, and so on until the first-order merge strings are provided on all of the tape units. Thereafter, a second-order merge is performed of all of the first-order merge strings that are on the second through last tape units, and this second-order merge string is recorded on the first tape unit.

Accordingly, at this time a larger cycle of the sorting process is completed, and the process returns to the initial operational condition in which internal sorts are successively developed and then merged into a first-order merge string, and so on until another complete set of first-order merge strings are developed on all of the tape units, and ultimately, the second larger cycle is completed by another second-order merge, and so on until all such second-order merge strings are completed. When all such second-order merge strings have been recorded on the tape units, a third-order merge of the second-order merge strings is performed in a similar fashion, which marks the end of a still larger cycle of operation. Thereafter, depending upon the quantity of data to be sorted, the process returns to the initial-sort operations successively which culminates, as described above, in the completion of the first-order merge cycle. The first-order merge cycles continue as described until a second-order merge cycle is completed; which second-order cycles continue successively until another third-order merge cycle is completed, and so on with such third-order merge cycles until the third-order merge strings are in turn merged into a fourth-order merge string. Thereby, the process may continue indefinitely as required by the quantity of data to be sorted. Each series of internal sort operations oscillates with a first-order merge operation until a complete series of the latter is completed, at which time a second-order merge is performed. Thereafter, there is a return to the oscillation of internal sorts and first-order merges, which is the basic operational feature that leads stepwise to the ordering of a larger and larger body of the original data on the input tape.

Figure 1H:
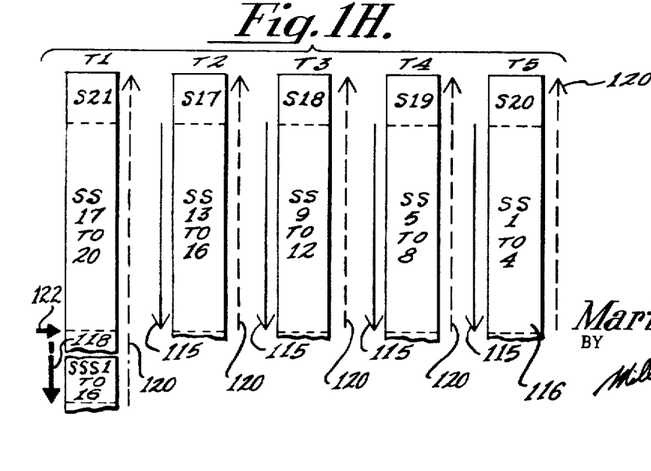
Figures 1I, 1J:
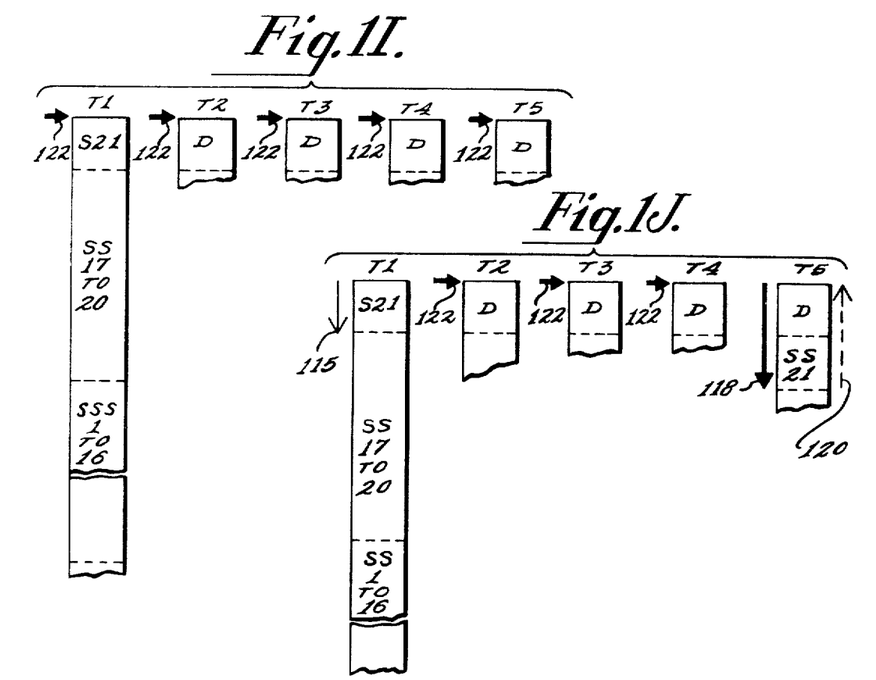
Figure 1K:
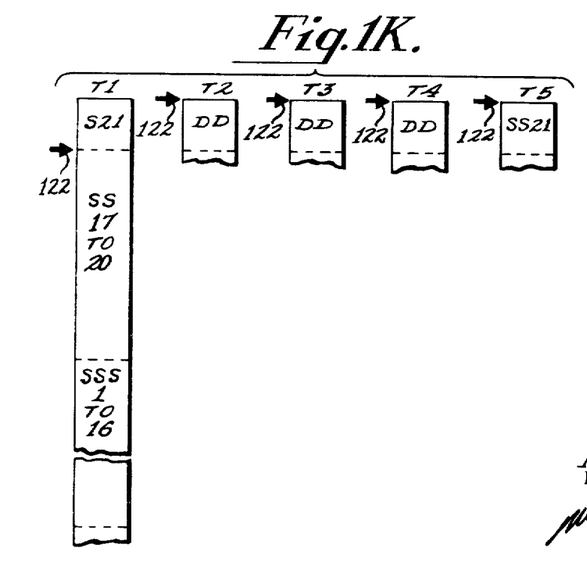
Figure 1L:
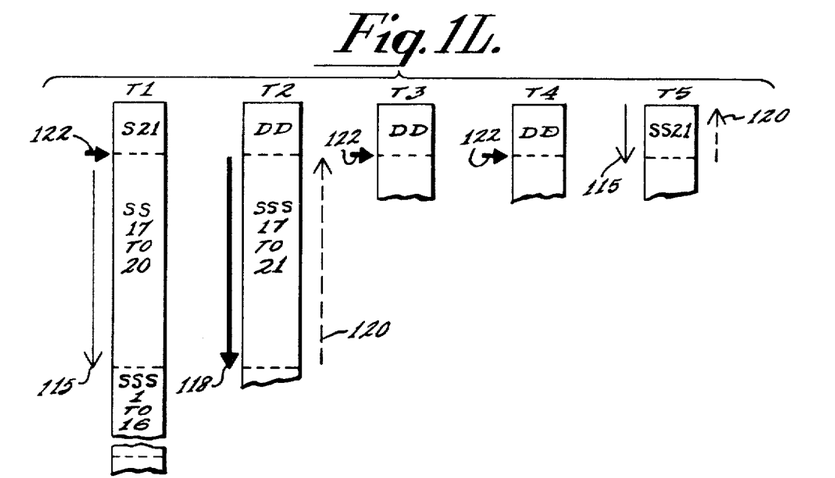

In FIGS. 1I to 1M, there are illustrated successive stages in the completion of the sorting operation of the data recorded as illustrated in FIG. 1H assuming that string S–21 is the last string of data to be ordered. Immediately following the second-order merge operation that led to the recording of the string SSS–1 to –16 on T–1, the operation reverts to the internal sort sub-program. However, the input tape 110 has no further data to be sorted, which condition may be indicated in any customary fashion such as the recording of a special character or group of characters indicating the end of the body of data. This end of data is recognized by the controls 108 as the controls are readied to initiate the internal sort sub-program, and in the absence of input data to be sorted, this sub-program is automatically skipped over. This condition is illustrated in FIG. 1I in which tape unit T–2 is shown with a "D" thereon to indicate a dummy operation as though the internal sort had been performed. This condition of a dummy operation may be actually recorded on T–2 by special representational characters; however, instead of starting and stopping the tapes when no data is being processed, the dummy operations are more readily handled by the control program and a special memory record may be made of the dummy operations in any appropriate fashion to keep track of the operational sequence. In a similar way, the successive internal sort sub-programs are skipped through, and a dummy operation is indicated for T–3, –4, and –5. Thereafter, as illustrated in FIG. 1J, the program oscillates to the merge sub-program, and the initially sorted string S–21 is handled as though it is to be merged with the dummy strings on T–2, –3, and –4. The string S–21 is in effect merely rewritten on T–5 where it is shown as merged string SS–21. The program then reverts to the internal sort sub-program for T–1 to –4, and dummy sorts are skipped over successively for T–1 to –4, and then a dummy first-order merge is skipped over as through it is to be recorded on T–4; this dummy merge is represented by DD on T–4 in FIG. 1K. These dummy cycles are then repeated as though first-order merges had been successively performed for T–3 and T–2, and are similarly indicated on FIG. 1K, Thereafter, since this completes the cycle of first-order merges for all of the tape units, the program goes on to a second-order merge of all of the first-order merge strings that have been completed. That is, the first-order merge strings SS–17 to –20 and SS–21 on tape units T–1 and T–5 are merged into a second-order merge string SSS–17 to –21 and recorded on T–2 (FIG. 1L). Since T–3 and –4 contain no strings, they are not involved in the operation.

Figure 1M:
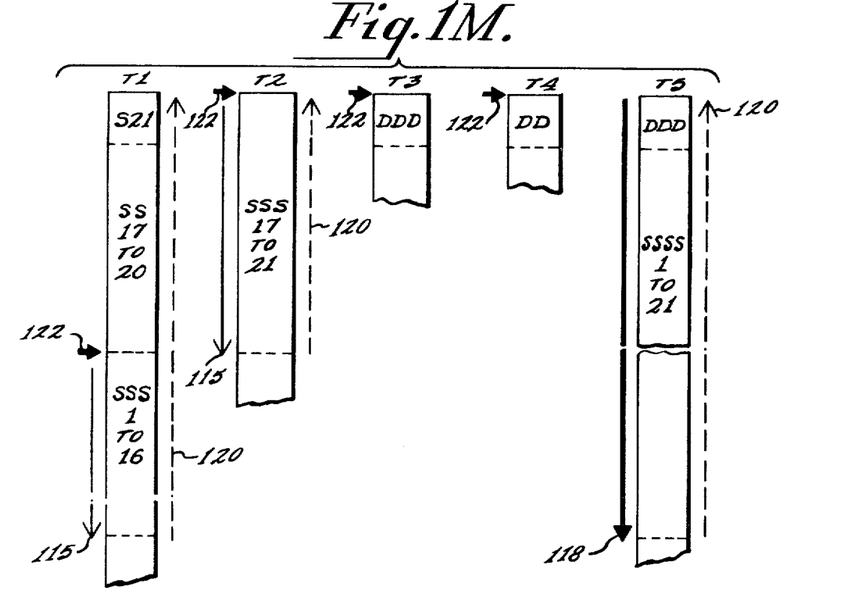

The program then reverts to the start of an internal sort sub-program in which successive dummy operations are skipped over, and the dummy internal sort sub-programs oscillate with the dummy first-order merge sub-program, and ultimately, all of the dummy second-order merge operations for tape units T–3, –4, and –5 are skipped over, as illustrated by DDD thereon. Upon the completion of the last dummy second-order merge operation, the program switches to a third-order merge of the second-order merge strings on T–1 to –4, and this third-order string is recorded on T–5. Since such data is recorded only on T–1 and –2, the third-order merge is a merge of those two strings to the string SSSS–1 to –21, as shown on T–5 in FIG. 1M. T–5 is rewound, and it contains the complete sort of the input data in a single string.

Figure 3A:
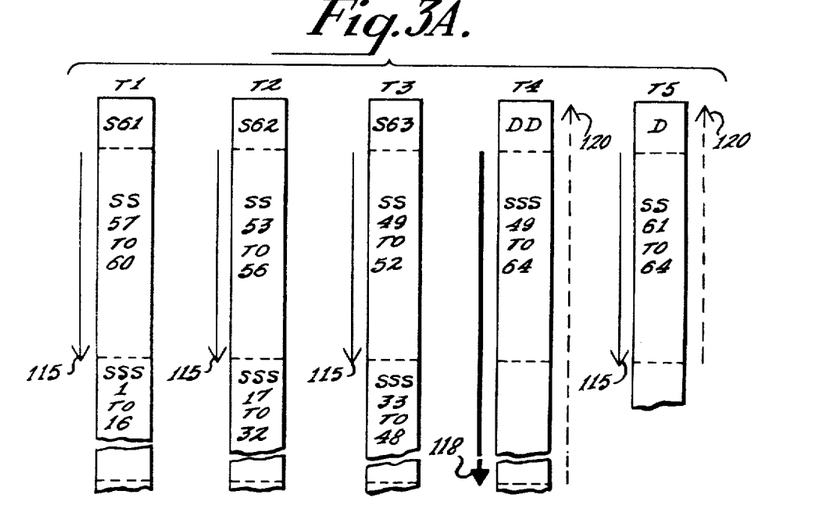
FIGS. 3A and 3B are schematic block diagrams of successive stages of the sorted data on the tape units of FIG. 1 illustrating a modified sequence of operation for a different body of data.
Figure 3B:
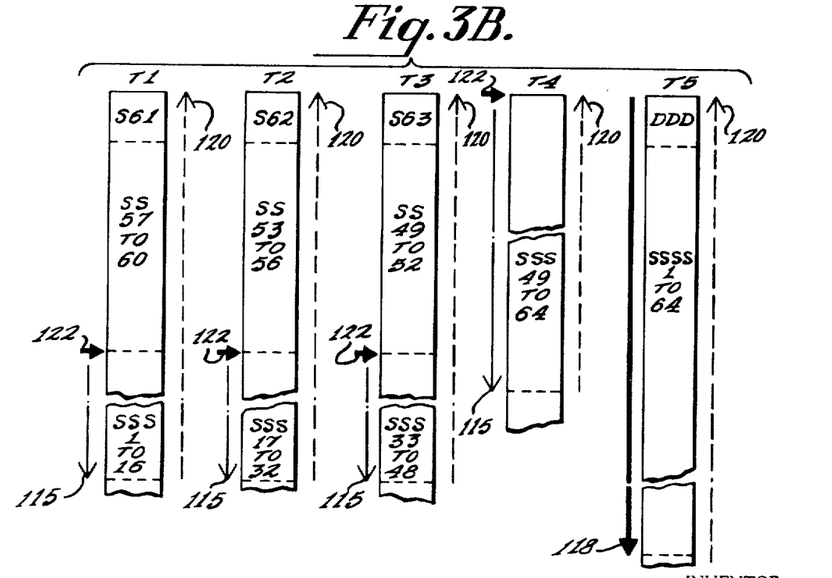

In FIGS. 3A and 3B, the operation of the invention is illustrated for the sorting of a larger body of data, namely, a body of 64 strings. FIG. 3A illustrates the condition of the data stored on the tape units just preceding the final merge of the data. The operations leading up to the conditions illustrated in FIG. 3A may be retraced as follows. The recording of second-order string SSS–1 to –16 (FIG. 1K) was followed by the writing of second-order string SSS–17 to –32 on T–2, and thereafter, the writing of second-order string SSS–33 to –48 on T–3, immediately after first-order merge string SS–49 to –52 had been written on T–3. Then, first-order merge string SS–53 to –56 was written on T–2 followed by SS–57 to –60 on T–1, immediately after internal sort string S–16 had been written on T–1. This operation was then followed by an internal sort string S–62 written on T–2, S–63 on T–3, S–64 on T–4, followed by a dummy first-order string on T–5, since there was no further input data to be sorted. Thereafter, the first-order merge string SS–61 to –64 was developed from the internal sort strings on T–1 to –4 and written on T–5, as shown in FIG. 3A. The program then skips through another cycle corresponding to a first-order merge DD to be written on T–4, which is followed by a second-order merge developing SSS–49 to –64 from the corresponding strings on T–1 to –5, and this last string is written on T–4 (FIG. 3A). Thereafter, a dummy cycle DDD (FIG. 3B) is skipped through corresponding to a second-order merge for T–5, which is followed by the final third-order merge operation to develop string SSSS–1 to –64 from the second-order strings recorded on T–1 to –4, and the final sorting of the data is completed on T–5 (FIG. 3B).

Figure 4:
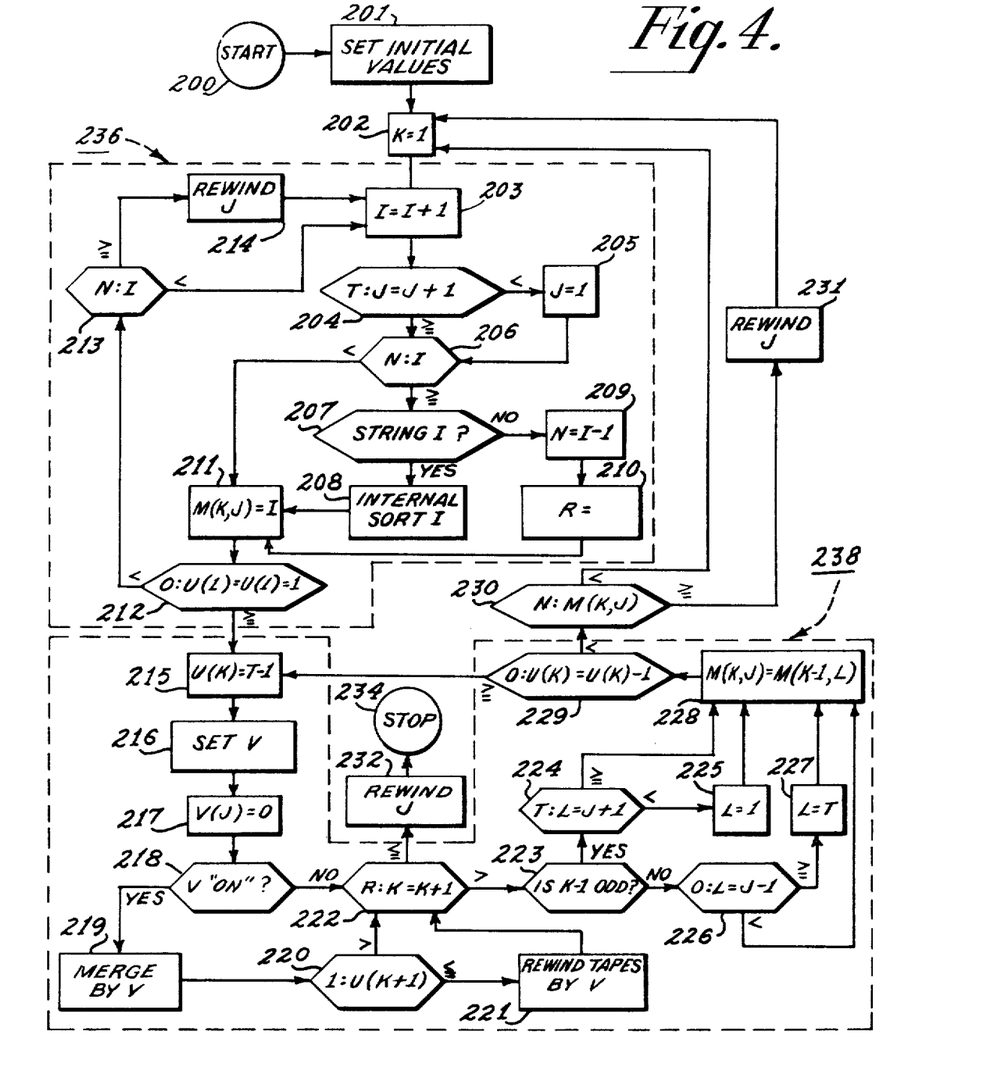
FIG. 4 is a schematic block diagram of a flow chart illustrating a program of control of the data processing system of FIG. 1 to carry out this invention.

A logic flow chart for the controls 108 of this data processing system is shown in FIG. 4. The conventions followed in this flow chart are used, for example, in the book "A Programming Language" by K. Iverson, John Wiley & Sons, 1962. Rectangular boxes indicate processes to be performed, and hexagonal boxes contain an augmentation of some quantity and/or a comparison to be made on the result. A particular branch route is taken from a hexagonal box when the mathematical relationship associated with that route represents in fact the comparison of those quantities that are associated by the colon; i.e. when the mathematical relationship may be substituted for the colon.

The program is initiated by a Start operation 200, and thereafter passes through a sequence of operations represented by the blocks 201 through 232 that sequentially determine the different portions of the program. The final operation is Stop 234. Three major loops are involved in this control program; they are a loop 236 consisting of the operational blocks 203 to 214 which define the control sub-program for developing initial sort strings and writing them on the tape units. A second loop 238, made up of operational blocks 215 to 229, defines the merge sub-program for developing the merge strings of different orders and writing them at appropriate tapes. A third loop consists of the first two loops 236 and 238 together with blocks 230, 231, and 202. This third loop is an overall control loop that in effect controls the loops 236 and 238 and controls the operations in transition from the merge loop 238 to the internal sort loop 236. The following description of the separate component blocks of the control program also indicates the interrelationships of these components.

*Block 201.*— Initiation of the Start operation causes this block to set initial values of most of the variables. These variables may be stored in appropriate portions of the memory 104 or in any other suitable registers. N, the number of strings to be merged, is set to the highest permissible value of strings that the input tape 110 may contain; this is done since N is not determined initially, but rather later in the program via the branch route of block 209. R, which is a function of N, is similarly set at its upper bound value until it is calculated in the branch block 210. T is the total number of work tapes that are available (e.g. five such tapes 116 are provided in the illustrative system of FIG. 1). I is the string number currently being developed by the program, and J is the current work tape number; initially, both these numbers are set to zero, and upon the first entry into loop 236, blocks 203 and 204 respectively set these numbers to one.

K is the level of sorting operation currently in operation, where level-1 contains strings S of unit length, level-2 contains strings SS of length T–1, and level-K contains strings of length $$(T-1)^{K-1} \qquad (1)$$

A vector U(K) has K elements which give the number of tapes still to be filled at the different K levels; initially, each such element of U for K equal to 1 through R is set to the value T, which indicates that all of the work tapes 116 are to be filled at all levels of the merge. These values will be changed and/or used in the blocks 212, 215, 220, and 229, as described below.

R represents the length of vector U, such that it is the smallest integral solution to the equation $$(T-1)^{R-1} \geq N \qquad (2)$$

M is a two-dimensional matrix of length R and width T, with one identifying coordinate being the level-K, and the other, the tape number L. The value of an element M(K, L) of that matrix is the number of the lowest initial string in the sorted string at level-K on tape L. Initially, each element (for all values of K from 1 to R and of L from 1 to T) of the matrix M is set to zero.

*Block 202.*—After setting of the initial values, initial entry into the overall control loop is via block 202, and re-entry to block 202 from the merge sub-loop 238 is via blocks 230 and 231. In this block 202, the level number K is reset to one upon each such entry or re-entry. K is used as an index to vector U and to matrix M, as noted above, and also as a check for the end of the program in block 222.

*Block 203.*—This block initiates the internal-sort control loop 236 and augments I by one upon each entry to this loop. Thus, on the first entry to loop 236, I assumes the value of 1, representing the first string that is in operation. This number is used in blocks 206, 207, 209, and 211, as described below. Block 203 is also entered from blocks 213 and 214 when loop 236 is operated iteratively.

*Blocks 204 and 205.*—Block 204 augments J (initially set to zero) by one, and then compares (as indicated by the colon in that block) T with the augmented value of J. If the total number T of working tapes is greater than or equal to J, the current tape being operated on, the program steps to the next operation of block 206. However, if T is less than J, the program branches to block 205 which is effective to reset J to one, and the program then steps to block 206. Thus, the blocks 204 and 205 effectively act as a ring counter to successively step the current tape number J. If the tape units are considered as being placed in a ring numbered from 1 to 5 and back to 1, J has its value successively stepped to the number of the tape unit to the right of the last one operated on.

*Block 206.*—This block compares the total number N of strings to be merged with the number of the current string. If the total number of strings is less than the current string number, the current string must not be a real string, but rather a "dummy," and control is transferred to block 211; otherwise, the current string is assumed to be a real one, and control passes to block 207.

*Block 207.*—This block determines from the input data whether there is another string being supplied by the input tape 110. In practice, it is a common convention to terminate the tape recording of a set of data by an empty list or some special set of characters or a set of hash marks. Whatever convention is followed, this block repeatedly checks the input data for such termination identification. If the program operation 207 determines from such a check that there is no other string, control is transferred to block 209; on the other hand, if there is another real string available, control passes to block 208.

*Block 208.*—This block controls the initiation of the internal sort sub-program and the writing of the internal-sort string onto the current tape J. Any appropriate internal-sort program may be used without affecting the control program.

*Block 209.*—Control is transferred to this block when block 207 determines that the end of the input strings has been reached. Since the current string is then the first dummy string, N is set equal to the number of the preceding string I-1. All future strings will be dummy strings and will be recognized as such by block 206 since N will be less than all future values of I.

*Block 210*—The number R is computed by this operation and is computed in accordance with the relationship set forth in Equation 3 below. R determines when the program is completed, that is, when all of the N real strings have been merged into a single string. This termination should come about when the relationship of Equation 2 first occurs; i.e. when the terminal level R is the first solution to the Equation 2 or when for the first time $$R = 1 + \frac{\log N}{\log (T-1)} \quad (3)$$

and when the current level K is equal to or exceeds that value of R. This latter determination is made by block 222, and when it occurs, the program terminates.

*Block 211.*—This block has its entry points from blocks 206, 208, or 210, depending upon the branching of the program as described above. Block 211 establishes the number of the initial-sort string as the value of M for K=1 and for L equal to the number of tape-J currently in operation. This string number I is then stored in the corresponding register of this matrix M, and control passes to block 211.

*Block 212.*—This block makes a decision either to terminate the initial-sort loop 236 or to repeat it. The vector U for the level K=1 is decreased by one since another tape has been filled with an initial sort string. The new value of U represents the number of tapes still to be filled at this level K=1. Block 212 determines if zero is less than the new value of U (which indicates that there are further tapes to be filled at this level) and the control branches to block 213 to continue the initial sort program 236. However, if zero is not less than this new value of U (indicating that there are no more tapes to be filled at this level and that merging should start; e.g. the condition illustrated in FIG. 1A), the control is transferred to the merge loop 238.

*Blocks 213 and 214.*—Block 213 determines whether N is less than I which indicates that the current string I is a dummy and that no data was written on the current tape J (e.g. FIG. 1I); whereby control is transferred directly to block 203 to repeat the initial sort loop 236. However, if the current string is a real one, data was written on the current tape J, and it must be rewound under the control of block 214 before re-entering control in block 203 (see arrows 120 in FIG. 1A).

*Loop 236 summarized.*—Initial sort loop 236 is entered only by way of block 203 after block 202 has reset K=1. Each time there is a pass through loop 236, the current tape number J is augmented to step to the next value on a ring counter basis. Each pass of real data from input tape 110 results in block 208 controlling the performance of an internal sort on the string of input data and the writing of the internal sort string on tape J, and block 211 registers in M the number of the initial sort string for tape J and level-1. When the input data terminates, block 207 recognizes this condition, block 209 establishes the number of the last string of real data, block 210 computes R, and the internal sort program 208 is bypassed (e.g. tape T-2 in FIG. 1I). Thereafter, block 206 recognizes that subsequent strings I are dummy strings to bypass the internal sort sub-program (e.g. tapes T-3 to -5 in FIG. 1I). Initially, block 201 sets the value of U equal to T so that T initial-sort strings (five in the example of FIG. 1) are recorded on the T tapes before control is transferred to the merge sub-program 238. Thereafter, as is described below, block 215 resets U to T-1 for the first level so that subsequent passes through the initial sort loop 236 are reiterated T-1 times (four times in the example of FIG. 1). The last tape to receive an internal sort string upon transfer out of loop 236 to loop 238 is not rewound since block 214 is bypassed. This condition is illustrated in FIG. 1A where T-5 is left in its final position after the recording of S-5 as indicated by arrowhead 122 in FIG. 1B; thereby, it is in condition to receive the merge string SS-1 to -4 immediately after S-5.

*Block 215.*—The vector U(K) which represents the number of tapes to be filled is reset to its full value; this value is T-1 since only T-1 tapes will be merged by loop 238 (FIG. 1B). That one of the tapes on which the merged string is written (T-5 in FIG. 1C) will be left with its initial string upon return to loop 236, and it is subsequently merged upon the next pass through loop 238 (FIG. 1D).

*Blocks 216 and 217.*—Block 216 sets the values of elements of a vector V(L), which is of length T in accordance with the following relationships:

$$V(L) = 1 \text{ if } M(K, L) \leq N$$
$$V(L) = 0 \text{ if } M(K, L) > N \quad (4)$$

That is, a tape unit whose smallest initial string at the current level is real (its M value does not exceed N) has its position in V set to one. However, each element of V corresponding to a tape unit with a dummy string as the initial string at the current level is set to zero; thereby, tape units with such dummy strings are not operated for the merge operation. The program then steps to block 217 which changes the element of V corresponding to the current tape J (the one on which the strings will be merged) to zero; thereby, data is not read from the J tape for the merging operation.

*Block 218.*—This block determines if any of the elements of V are "on" (i.e. equal to one); if not, control is transferred to block 222. However, if there is at least one real string to be merged, control is transferred to block 219.

*Block 219.*—All tapes having real strings (i.e. tapes whose V elements are set to one) at the current level K are merged and written onto tape J at the next level $K+1$.

*Block 220.*—This block compares the number one with the value of vector U for the level $K+1$; this vector is equal to zero when all of the tapes have been merged at the level $K+1$ so that a merge is to be performed immediately at the succeeding level. In this case (FIG. 1G) no tapes are to be rewound, and control is transferred directly to block 222. If there is at least one tape that is not filled at the level $K+1$, the next operation is not a merge, and control is transferred to block 221 (FIG. 1F).

*Block 221.*—This block determines which tapes are rewound in accordance with either of the following two conditions: (1) If there is no data at the present merge level for some tape; that is $$M(K+1, L) \leq 0 \qquad (5)$$

(2) If a later first level string will be real; that is $$M(1, L) + T \leq N \qquad (6)$$

Thus, those tapes marked by $V=1$ are rewound if either of the above two conditions exist. Those tapes marked by $V=0$ (viz. those that had dummy strings and were not involved in the merge) are not rewound; and tape J for which $V=0$ is not rewound since a further merge may be made on it. The absence of the above two conditions determines whether any of the merging tapes should be kept in their current tape positions for another merge (see FIGS. 1L and 1M). After the rewinding of appropriate tapes is initiated, control is transferred to block 222.

*Block 222.*—This block is entered from either block 220 or block 221 as explained above. The test for terminating the overall control program is made in block 222. K is augmented to $K+1$, representing the level of the actual or bypassed merge, and $K+1$ is compared with the maximum level number R. If the final level has been reached, the test indicates that the N strings have been merged on tape J so that the final merge is completed, and control is transferred to block 232. However, if the final level is not yet reached, control is transferred to block 223. The true value of R was calculated in block 210 when the first dummy string was reached; initially, R was set to some maximum value. Thus, termination of the program occurs only upon the final level being reached. If the final level is not reached, control transfers to block 223.

*Blocks 223 to 227.*—These blocks together with block 228 are used to establish and register the M value for the newly merged string on tape J. For this purpose, the tape L that was the source of the lowest string number from level $K-1$ is identified, and its M is carried forward as explained below under "Block 228." Blocks 223 to 227 are used to identify L.

If $K-1$ (the source level) is an odd number, block 223 transfers control to block 224. The latter augments the current tape number J by one, which determines the value of L, which in turn is compared with T. When the value of L is less than the number of tape units, control is transferred to block 228; if not, control is transferred to block 225 which sets the value of L equal to one and passes control to block 228. Thus, blocks 224 and 225 determine the source-tape number L; that is, at odd levels, the strings build up to the right in increasing numerical order, and the source tape is the next highest order tape (see FIGS. 1D to 1F). Therefore, block 224 is used to augment the string number to get the source L; and if there is an overflow greater than the number of tape units, then block 225 recycles to the first tape unit to get the source L.

If $K-1$ is an even number, control is transferred from block 223 to block 226, and J is decreased by one to get the source tape L. That is, on the even levels, the merged strings are set down successively in the tape units in decreasing numerical order, and the source L is the next lower order tape. If the source L is greater than zero, control is transferred directly to block 228 (FIG. 1M); however, if the source L is less than or equal to zero (FIG. 1H), then it must be reset to the highest tape unit number T, which operation is performed by block 227. Control is transferred to block 228 thereafter.

*Block 228.*—The number $M(K, J)$ of the lowest initial string at the current level K at which the merge was just written on tape J is set at $M(K-1, L)$, namely at the lowest initial string number at level $K-1$ on tape L as determined in blocks 223 to 227. That is, the lowest M of the $K-1$ level is carried forward and registered as $M(K, J)$. Thereafter, control transfers to block 229.

*Block 229.*—This block tests for the termination of the merge loop 238. The element of the vector U (which was initially set to T) at the current merge level K is decreased by one, indicating that another tape has been filled at that level. If the result is zero, no more tapes need be filled at this level; which indicates that the next operation is another merge, and control is transferred to block 215 to initiate another pass through the merge loop 238. However, if the result of the decrement in block 229 is greater than zero, control is transferred to block 230 which terminates the merge loop 238.

*Loop 238 summarized.*—The merge loop has one entrance, block 215, and one exit, block 229 (and additionally, the exit via block 222, which is used at the termination of the program. On each cycle of the loop, T–1 tapes at the level K are merged to form a string on tape J at level $K+1$. The blocks 216 and 217 set the V indices and thereby determine which of the tapes are to supply merging strings and which tape is to receive the merged strings. Blocks 220 and 221 determine whether the conditions require rewinding of tapes, and if so, block 221 determines which tapes are rewound from the V indices. Block 222 checks for the end of a program and at the same time redefines the new merged level as K and the level from which the strings were supplied as $K-1$. Blocks 223 to 228 determine the source tape L of the lowest elemental string in the merge and establish this as $M(K, J)$ for the newly merged string. Block 229 determines whether any further tapes require merging at the merge level K and thereby, whether the merge loop 238 is to be repeated or whether there is to be an exit to block 230.

*Blocks 230 and 231.*—If $M(K, J)$ is less than N, the last merge via loop 238 was a dummy merge (see, for example, T–2 to T–4 in FIG. 6). Therefore, no rewind is necessary, and control is transferred directly to block 202. However, if $M(K, J) \leq N$, the merged string was a real one, and control is transferred to block 231 to rewind tape J on which the newly merged string was written, and thereafter control is transferred to block 202.

*Loop of blocks 202 to 231 summarized.*—Block 202 sets $K=1$ to initiate operation of the initial-sort loop 236. Loop 236 operates repeatedly to fill all of the tapes at the first level. The first time loop 236 is entered, there are T passes through that loop as determined by the initial setting of U in block 201; however, thereafter block 215 in loop 238 resets $U(1)$ to T–1. Upon all the tapes being filled by loop 236 at the first level, transfer of control takes place to loop 238, and it is effective to merge the strings on T–1 tapes onto the remaining tape. Thereafter, control is transferred from loop 238 via blocks 230, 231, and 202 back to loop 236 to again fill the tapes at the first level. This cycling continues until all of the tapes are filled with merged strings at the second level. At that time, block 229 transfers control back to block 215 to repeat the merge loop 238. Block 215 sets the vector U for the second level at T–1 since the first-order merge string on one of the tapes will not be merged during this passage through loop 238. Thereafter, the T–1 strings are merged onto another tape, and there is an exit from loop 238 via blocks 230 and 231 and back to the initial sort loop 236 via block 202. This cycling continues indefinitely as explained above until the final level is reached and the proper string length has been written on a tape J. This condition is recognized by block 222, and control is transferred to block 232.

*Blocks 232 and 234.*—When the end of the program is reached, all of those tapes supplying strings to the final merge are rewound by block 221; and tape J on which the final merged string is written is left at its final recording position. Block 232 then operates to rewind J and pass control to the Stop operation 234 which terminates operation of the program.

It will be seen from the above description of the invention and of FIG. 4 that all of the data processing operations involved in carrying out the control program are basic operations that are generally available in any digital computer. These operations are simple arithmetic operations such as addition and subtraction and comparison. In addition, certain control operations, such as rewinding the tapes, are of course readily performed in any computer that utilizes magnetic tapes. The control block 207 also involves the standard operation of starting and stopping the input tape; and the operations of internal sort in block 208 and merge in block 219 involve the forward reeling of the output tapes 116. Suitable programs for performing the internal sort and merge functions are also well known in the art; see, for example, the general information manual, "Sorting Methods for IBM Data Processing Systems," 1958.

This invention may be employed with various data processors such as the IBM computers 701, 704, 705, 709, 7070, 7090, 1401, and 1410. Examples of tape units that read in a forward direction only are the IBM 729 tape transports, Control Data Corp. tape transports, Remington Rand Univac III–C transports, and others. This invention may also be used with tape transports that read in both backward and forward directions, such as the Univac III–A tape transport, the Philco 334, and RCA 301 and 501 tape transports. Where tape transports that permit reading in a backward direction are utilized, this characteristic is not employed in this invention. However, notwithstanding, this invention may provide certain advantages over certain techniques that employ reading in the back direction since tape transports may have a high interlock time in shifting from reading in one direction to reading in the opposite direction. The efficiency of this system in reducing the amount of tape rewind time makes its use practical with tape transports providing for read backward as well as forward. Thus, the ability to rewind one tape while the computer is released for operating on a succeeding tape is an important feature of this invention. Other important features are the use of all tapes at each level of operation (namely, for internal sorts and all merges up to the final merge), and the development of the final merge on a tape that is unencumbered by other preliminary data, which final merge has the data properly recorded for any future use.

This invention affords a very efficient use of the computer in performing the sorting operation. The efficiency of the sorting technique is known as "the way of the merge" or "power of the merge". In certain conventional sorting programs, half of the tapes are used to contain the strings that are to be merged, and the other half, to receive the emerged strings. Such a technique called the "balanced merge" has a way of the merge equal to one-half the number of tape units or $T/2$. It can be shown that the way of the merge of the system of this invention is $T-1$, where T is the number of output tape units; and for any large number of tape units, it is more efficient generally than the aforementioned balanced merge.

This invention is applicable to data strings of a fixed length which may be composed of records that are either fixed or variable in length. As is customary in the art, each record and string has beginning and ending identifiers that may follow various well-known conventions. A fixed length string is composed of a number of uniform blocks (which, for example, may be one-thousand characters in length), whereby variable length records may be accommodated and a variable number of such records may be processed. Some types of tape units have calibration marks which identify start and stop points of each block of information to be written and provide appropriate gaps between each block to afford start and stop times for the tape. This conventional arrangement permits a tape to be stopped after reading a block and restarted, and the gap affords adequate time for the correct operating speed to be reached before the next block is read. With such a calibrated tape unit, it is relatively convenient to assure the write of an internal sort in front of an already written merge string without any danger of the new internal sort being written over the recording of the previous merge string. Where the tape units do not have such calibration marks, the program itself may be developed by means of well-known techniques whereby at the end of every string that is written on the tape, an appendage is added which is noninformational in form, but which provides index and advisory signals of sufficient length. This arrangement ensures that successive strings are properly spaced and ensures the ability to write a string in the space in front of a previously written string without danger. This technique can be readily implemented by providing an appropriate sub-routine to which the program jumps each time an end of the string is encountered on the readout operation. Such a sub-routine would record an appropriate number or hash marks to ensure adequate tolerance of the spacing between strings. The program would also be adapted to discard any such non-informational signals when they are read back and to initite the reading information only upon reading an initial string identifier character or series thereof.

Accordingly, a new and improved system for sorting large quantities of data in an efficient manner is provided by this invention. This invention is adapted for tape memory units that are operated for reading in one direction only. Notwithstanding this limitation on the use of the tape units for forward direction reading, the program is efficient in that the tape rewind time is generally not lost time since the rewind is arranged to occur while other operations are taking place, and all of the tape units are used in the sorting operations.

This invention is not limited in its scope to the particular embodiment described above, and variations in the form of the invention are contemplated thereby.

What is claimed is:

1. In a data processing system including a plurality of magnetic tape units for serially storing data signal combinations and having means for reading and writing signals during reeling thereof in a forward direction, and means for rewinding to an initial position, a memory, and control and arithmetic units including means for transferring data signals between said tape units and said memory and between said arithmetic unit and said memory, and means for performing sort operations on groups of said data signal combinaions via said memory to form strings thereof and for performing merge operations on said signal strings via said memory to form longer strings;

a control system for directing the operation of said data processing system to process a body of said data signal combinations ot a sorted sequence on one of said tape units; sai dcontrol system comprising:

(a) a first iterative control loop means having means for initiating operation of said sort performing means to sort sets of said data signal combinations into sorted strings of a first order, means for initiating writing by said writing means of said strings on said tape units, and means for initiating said rewinding means to rewind each of said tape units during the sorting and writing for a succeeding tape unit, and means for repeating the initiation of said sorting means, said writing means, and said rewinding means to sort successive signal sets into said first order strings and write them on successive ones of said tape units until all of said tape units contain said first order strings;

(b) a second iterative control loop means having means for initiating the reading in the forward direction by said reading means of strings of the same order from all of said tape units except one, means for initiating operation of said merge performing means to merge said read strings to a string of a higher order, means for initiating writing by said writing means of said higher order string on said one unit, means for registering the condition of said tape units storing higher order strings, and means responsive to said registering means registering the condition of all of said tape units storing said higher order strings to repeat the initiation of said reading means, said merge performing means and writing means to develop a string of a still higher order; and (c) a third iterative control loop means for directing the alternating operation of the aforementioned first and second control loop means one with the other including means for initiating operation of said second control loop means when all of said tape units are storing first order strings, and for initiating said rewinding means to rewind said read tape units, and for initiating operation of said first control loop means after operation of said second control loop means in response to said registering means registering the condition of less than all of said tape units storing said higher order strings;

whereby the sort and merge operations are repeated until the body of data signal combinations is sorted in a single string.

2. For use in a data processing system including a plurality of magnetic tape units for serially storing data signal combinations and having means for reading and writing signals during reeling thereof in a forward direction, and means for rewinding to an initial position, a memory, and control and arithmetic units including means for transferring data signals between said tape units and said memory and between said arithmetic unit and said memory, and means for performing sort operations on groups of said data signal combinations via said memory to form strings thereof and for performing merge operations on said signal strings via said memory to form longer strings;

a control system for directing the operation of said data processing system to process a body of said data signal combinations to a sorted sequence on one of said tape units; said control system comprising:

(a) a first iterative control loop means having means for initiating operation of said sort performing means to sort sets of said data signal combinations into sorted strings of a first order, means for initiating writing by said writing means of said strings on said tape units, and means for initiating said rewinding means to rewind each of said tape units during the sorting and writing for a succeeding tape unit, and means for repeating the initiation of said sorting means, said writing means, and said rewinding means to sort successive signal sets into said first order strings and write them on successive ones of said tape units until all of said tape units contain said first order strings;

(b) a second iterative control loop means having means for initiating the reading in the forward direction by said reading means of strings of the same order from all of said tape units except one, means for initiating operation of said merge performing means to merge said read strings to a string of a higher order, means for initiating writing by said writing means of said higher order string on said one unit, means for registering the condition of said tape units storing higher order strings, and means responsive to said registering means registering the condition of all of said tape units storing said higher order strings to repeat the initiation of said reading means, said merge performing means and writing means to develop a string of a still higher order; and (c) a third iterative control loop means for directing the alternating operation of the aforementioned first and second control loop means one with the other including means for initiating operation of said second control loop means when all of said tape units are storing first order strings, and for initiating said rewinding means to rewind said read tape units, and for initiating operation of said first control loop means after operation of said second control loop means in response to said registering means registering the condition of less than all of said tape units storing said higher order strings;

whereby the sort and merge operations are repeated until the body of data signal combinations is sorted in a single string.

References Cited

UNITED STATES PATENTS

| | | | |
|---|---|---|---|
| 3,242,466 | 3/1966 | Dirks | 340—172.5 |
| 3,081,445 | 3/1963 | Rogal | 340—172.5 |
| 3,024,445 | 3/1962 | Spielberg et al. | 340—172.5 |
| 2,985,864 | 5/1961 | Fillebrown et al. | 340—172.5 |
| 2,974,306 | 3/1961 | Femmer | 340—172.5 |
| 2,935,732 | 5/1960 | Guerber | 340—174 |
| 2,911,624 | 11/1959 | Booth et al. | 340—174 |

ROBERT C. BAILEY, *Primary Examiner.*

GARY D. SHAW, *Examiner.*